March 4, 1924.
I. FLORMAN
MOUNTING FOR AUTOMOBILE ORNAMENTS
Filed March 12, 1923　2 Sheets-Sheet 1
1,485,843
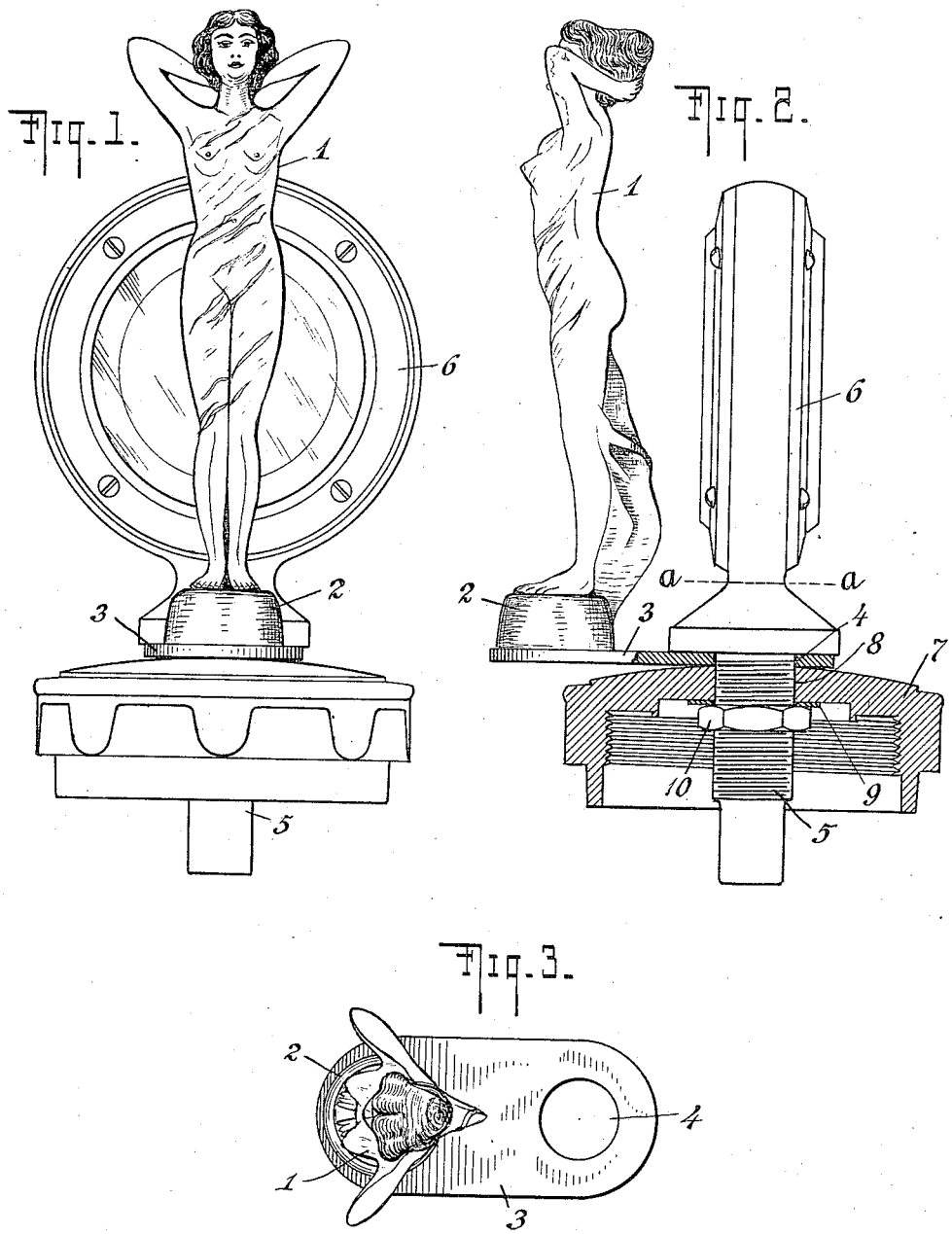
WITNESS
INVENTOR
IRVING FLORMAN
BY
ATTORNEYS March 4, 1924.
I. FLORMAN
MOUNTING FOR AUTOMOBILE ORNAMENTS
Filed March 12, 1923    2 Sheets-Sheet 2
1,485,843
Fig. 4.
Fig. 5.
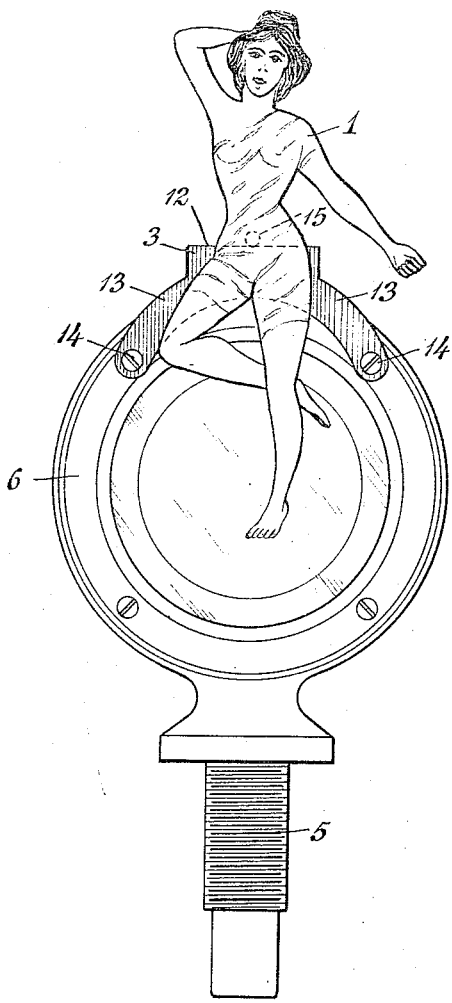
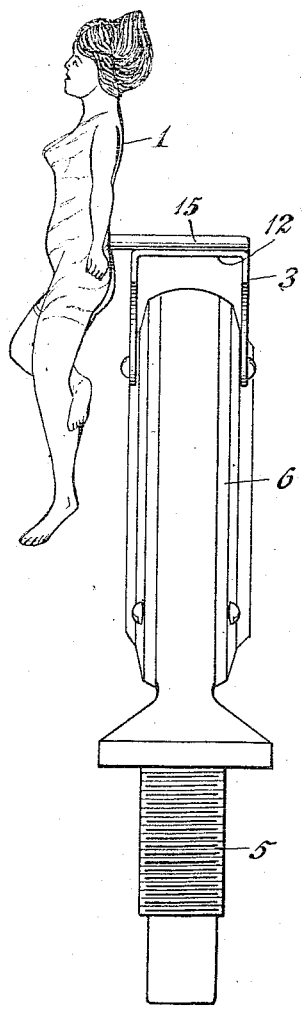
WITNESS
INVENTOR
IRVING FLORMAN
BY
ATTORNEYS Patented Mar. 4, 1924.

1,485,843

UNITED STATES PATENT OFFICE.

IRVING FLORMAN, OF NEW YORK, N. Y.

MOUNTING FOR AUTOMOBILE ORNAMENTS.

Application filed March 12, 1923. Serial No. 624,675.

*To all whom it may concern:*

Be it known that I, IRVING FLORMAN, a citizen of the United States, and resident of the borough of Manhattan, city and State of New York, have invented certain new and useful Improvements in Mountings for Automobile Ornaments, of which the following is a clear and exact specification.

The object of this invention is to so mount an ornament or mascot upon an automobile, particularly over the radiator cap thereof so that the constant jarring and vibration of the automobile will not break or crack it. This is accomplished by securing the ornament to a shock absorber which is in turn secured to the automobile proper. It will be readily understood, that by providing such a shock absorber for the ornament, the vibration, jarring and bumping of the automobile will be absorbed by the shock absorber and not by the ornament. For the purpose of illustrating the invention it has been shown, in the annexed drawings, in connection with a device for indicating the temperature within the cooling system of an automobile, inasmuch as such ornaments may be used in such connection, although it is evident that the device may be used independently of the temperature indicator.

In the drawings Fig. 1 shows a front view of this invention; Fig. 2 a cross section through the radiator cap of an automobile and a side view of the shock absorber secured thereto. Fig. 3 is a top view of the mascot secured to the shock absorber; Fig. 4 is a front view of a modification of this invention and Fig. 5 a side view of the figure in Fig. 4. The drawings represent substantially the actual size and proportions preferred in making the subject matter of this invention.

In the drawings 1 represents an automobile ornament which may be any desired figure and is usually made of white metal or bronze. The figure 1 is cast with the base 2 which is soldered or otherwise secured to the forward end of the shock absorber 3. The shock absorber 3 consists of a piece of spring metal preferably steel or brass having an aperture 4 therein, through which the stem 5, of a temperature indicator 6 is passed. The radiator cap 7 of the automobile also has a corresponding aperture 8 therein, through which the stem 5 is also passed thereby positioning the shock absorber 3, between the base of the indicator and the outer top surface of the radiator cap 7. The ornament is then positioned so that it stands forwardly of the temperature indicator and is secured in that position by means of the washer 9 and the nut 10 which is tightened at the inner under surface of the top of the radiator cap 7. The radiator cap 7 may then be secured to its usual position over the filling spout of an automobile radiator. I do not intend, however, to limit myself to the position of the ornament relative to the temperature indicator or the shock absorber. It will be noted from examination of Figs. 1 and 2 that the ornament 1 and the forward end of the shock absorber 3 over the radiator cap 7 stand freely, and as the automobile travels the shock, jarring and vibration caused thereby will be absorbed by the shock absorber 3, relieving the ornament entirely from shock and strain and insuring it against breaking. In fact, as the automobile runs, there is a constant vibration of the shock absorber 3. The figure 1 including the base weighs about ten ounces.

The device may be secured to the radiator cap even though a temperature indicator 6 is not used and this may be done by a bolt of a shape and structure like that shown as forming part of the temperature indicator below the line a—a in Fig. 2.

A modification of the invention is shown in Figs. 4 and 5. In this modification the shock absorber 3 consists of a platform or top plate 12 to which the ornament is secured. The ornament may be secured by the pin 15, one end of which is soldered to the top of the plate 12 and the other end secured in the body of the ornament 1 or the ornament may be soldered to the top of the platform in the same position as shown and described in connection with the ornament of Fig. 1. The four legs 13 radiate from the platform and are intended to embrace the front and back of the temperature indicator. The end of each leg 13 has an aperture therein, whereby the legs may be secured by means of the screws 14 to the temperature indicator. In this modification the shock and vibration of the running automobile are chiefly absorbed or taken up by the spring legs 13, although there is spring in the pin 15. The structure of Fig. 4 is preferably made from a single piece of sheet metal.

I claim:

1. A mounting for an automobile ornament adapted to be attached to a temperature indicating instrument comprising a platform on which the ornament is mounted, integral portions depending from said platform, legs on said depending portions, each legs having an aperture therein, and means passing through said apertures for attaching the mounting to the rim of the temperature indicating instrument.

2. A mounting for an automobile ornament adapted to be attached to a temperature indicating instrument, comprising a platform, spaced members depending from said platform and integral therewith, a plurality of resilient legs on each depending portion and means at the free ends of the legs for attaching the ornament.

3. A mounting adapted to be attached to an automobile temperature indicating instrument made of sheet metal comprising a platform adapted to have secured thereto an ornament, legs integral with said platform, said legs extending outwardly and downwardly with relation thereto and being provided with apertures adapted to receive attaching means.

4. A mounting for an automobile ornament adapted to be mounted on a motometer comprising a platform, adapted to have secured thereto an ornament, flanges extending substantially perpendicularly to said platform and radially extending diverging legs integrally connected with each of said flanges and means to connect said legs to the rim of the motometer.

5. A mounting for an automobile ornament adapted to be secured to a disk shaped instrument and made from a single piece of material comprising a platform adapted to have secured thereto an ornament, downwardly extending flanges on each side of said platform and legs extending from each of said flanges, said legs adapted to engage the front and back of the disk shaped instrument and to be secured thereto.

6. A mounting for an automobile ornament adapted to be mounted on a temperature indicating instrument comprising a platform adapted to have secured thereto an ornament, and radially extending diverging legs connected with said platform, and means whereby the extremity of said legs may be attached to the rim of said instrument.

In testimony whereof I have hereunto set my hand.

IRVING FLORMAN.